March 26, 1935.  L. F. C. HAAS  1,995,475
VALVE
Filed Oct. 23, 1928
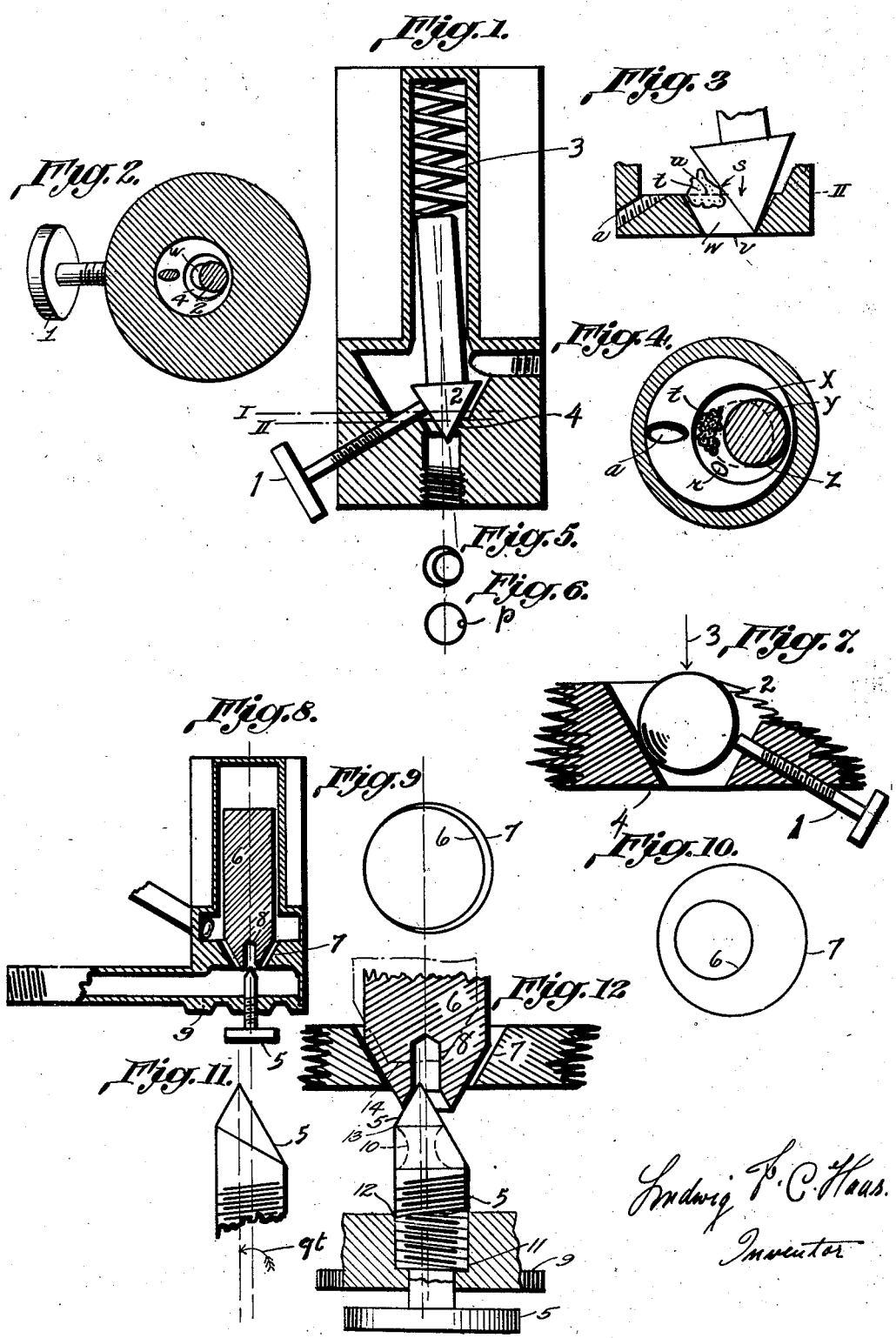

Patented Mar. 26, 1935

1,995,475

UNITED STATES PATENT OFFICE 1,995,475

VALVE

Ludwig F. C. Haas, Lancaster, Pa.

Application October 23, 1928, Serial No. 314,363

3 Claims. (Cl. 251—140)

This invention relates to valves of small size for running fluids under control, especially those containing dirt of microscopic size, and those which must run in a minute or microscopic stream.

It has been the known quality of valves of commerce that they plug up with foreign particles, when they are turned down to deliver a slight stream.

My object in this invention is to overcome in a degree the stoppage in valves used in the said manner, and by using the more available facts gathered in my toil and study, to disclose a new and radically distinctive design of valve which does satisfy, in fact currently flushes stoppage settling near and over the valve's discharge portal, or a partially open flowway opening, by providing therefor effective changes in its lateral gaping-form, adjustable through a movable index marked in graduations.

The valves shown herewith give several embodiments of my invention and are presented for illucidation only, to define the novelty contained in their design. Common changes are covered by the claims.

Valves as constructed heretofore have the spindle and seat co-axial, making the passageway between the point of the spindle and seat formed by two concentric circles. When the screw spindle is turned a fraction of a single turn and the point raised off the seat, possibly a thousandth of one inch represents the radial distance between the said concentric circles and is the passageway for a minute stream. The fluid containing dirt, any particle whose longest "diameter" exceeds one thousandths of an inch is likely to jam in this opening in the valve, and any particles even of lesser size will fasten themselves behind the bigger ones and shortly build outwards and around the circular passageway plugging it shut.

That device known as "plunger and socket", in general counterparts of each other, has been kept for use in my invention but the principles and methods of the past have been dropped. Instead of backing point of plunger away from its seat, and port in the valve, concentrically, I withdraw same eccentrically, holding it to one side of its seat, while applying the adjusting force laterally to the axis of the seat and tilting the axis of the plunger aside, forming a crescent shaped opening for the passageway.

Fig. 1 contains a longitudinal sectional view of a valve body, showing a plunger, seat, adjuster, and a spring tension.

Fig. 2 contains a lateral sectional view of a valve body on plane I of Fig. 1, just above the valve's floor, exposing the upper rim of its seat, the surface of its seat, lower rim of its seat and a cross section of the plunger's point; and the crescent shape of the passageway between these. Also a cross section of the adjuster's inner end.

Fig. 3 is a longitudinal section of the body of a valve seat removed from a valve body, showing a plunger point posed (as if in an "adjustment") high up. The upper portions of the plunger and seat are broken away, and the adjuster here is omitted.

Fig. 4 is a lateral section of this valve seat and plunger on plane II of Fig. 1, showing a deposit of non-fluid matter in the passageway between them.

Fig. 5 is a view of the peripheries only, of said plunger and seat.

Fig. 6 is a view of the same peripheries, but with the plunger at the upper reaches of its adjustment.

Fig. 7 is an axial section of a valve seat in which the plunger is a polished ball. Numbers of parts correspond to those in Fig. 1.

Fig. 8 is a longitudinal section of a modified form of valve body in which the valve adjusting member has longitudinal travel, and is in engagement with the plunger by means of a set-off-center pivoting. Such pivot bearing describes an arc whenever the adjusting member is turned, which pivotal means not only permits the plunger to have a free limited oblique universal sway, relative to the adjuster member, but also an unimpeded rotation. The adjusting member is itself mounted in a base plate or wall of the valve body, subjacent to the seat.

Fig. 9 is a view of the peripheries simply of the plunger and seat at lowermost adjustments of said valve adjusting member and its pivoted plunger.

Fig. 10 is a view of the same peripheries, but at the uppermost adjustments of said pivoted plunger.

Fig. 11 is a side view of a valve adjusting member set on the quarter (indicated by arrow, qt). Also note that the axis of the conical tip is off center from the axis of the screw or shaft.

Fig. 12 is the same side view of the said adjuster, but in engagement now with the plunger; and side views of a seat member and plunger shown in broken cross sections, and of the plunger shown in dotted lines standing off of the seat when in one of its positions. Said adjuster's spindle and screw, are shown mounted in a base plate better shown in Fig. 8, but which, in this example, may be rotated at will like a dial in the housing of the valve, subjacent to the seat. The middle portions of such base parts are shown broken away, showing in axial section an internally threaded cavity and shaft journal, which are occupied respectively by the said screw and a connecting shaft reaching to an outside thumb wheel of the adjuster.

In Fig. 1, 1 is a thumb screw, a limiting stop adjusting member, acting sidewise against the conical end of plunger 2. A light helical spring 3 is used to apply the axial force to the plunger 2, though gravity and various forces are available instead of the said spring's force, or with it. As the end of the thumb screw 1 advances towards the opposite side of seat 4, the conical end of plunger 2, sliding between and in contact with said end and seat 4, backs away, leaving a passageway, marked $w$ (see Fig. 2 and Fig. 3), like the crescent stated.

When the plunger's point is a right circular cone and the generatrix line of its surface is straight, then the cross section of it in plane I is an oval conic section, so near however, to a circle that it is shown circular for convenience here, and is hereinafter spoken of as a "circle", "crescent", "crescenti-form", etc.

In Fig. 3 the exact shape, side view, of said opening is shown between rims $u$ and $v$ of the passageway $w$, in which there is shown a clot of non-fluid $t$.

Clot $t$ is readily crushed, without a possible lateral escape from between the converging surfaces of the plunger and seat, as the plunger without any rotation, advances down and across as indicated by the arrows $s$, holding the particle $t$ firmly all the time. Upon this being crushed just a little only, the width of the lower crescent $vv$ being wider than the width of the upper crescent $u$, the slightly smashed particle $t$ will fall out of the passageway being now offered no resistance from its sides. In Fig. 4 the same is shown by the space (crescentic) between the two eccentric circles $x$ and $z$, peripheries of the seat (rim) and plunger respectively. The dotted concentric circle $y$ represents besides the nether rim of the passageway, a fanciful presence of an old style concentric plunger in this portway; thus contrasting the enormous size of the foreign matter $t$ capable of passing through my passageway, with the diminutive particles $r$ which stop the older portways. (Besides in contrast my adjuster at the side hole, $a$, necessarily prevents the plunger from revolving at all, while the revolving old style plunger only plows up the collected dirt and leads it around to a new position, and crushes nothing, since it cannot hold anything still.)

Intended for murky fluids, the valve can pass nodules of size. The altered shape of the passageway from a ring to a crescent, will not alter the flow, both having equal area, but the width of the crescent at its widest part is twice as wide as the ring; so that a valve constructed with such a passageway is superior in keeping itself clear, due to its ability to pass larger particles and larger quantities of solid matter in the fluid.

The selection of the style of valve and size depends upon the kind of fluid and amount of flow. The plunger may assume a spherical like mould or shape for some purposes, or being in the extreme case of Fig. 7, where the plunger is a ball. The crescentic area, as it is shown in Fig. 6, may be more useful being practically a full circle, in which the nether point of the plunger, marked $p$, is but a trifling obstruction in the passageway. By determining the maximum flow and allowing for it the very widest possible crescentic opening, approaching a full circle in shape, you will get the freest valve.

In Fig. 8 and Fig. 11 the adjustable valve actuating member and limiting stop 5 is shown beneath the plunger and seat 6 and 7 respectively. The plunger has in its tip a conical recess 8 into which the conical ended stop 5 fits. The conical end or the pivot 5 is shown enlarged in Fig. 11; its axis is off center from the axis of its screw shank, which carries it longitudinally back and forth. Also whenever stop 5 is adjusted it gives the plunger 6 a lateral and upward (or downward) motion with respect to its seat 7.

In lower stages of adjustments 5, see Fig. 12, the plunger 6 is in wiping (rolling) contact with seat 7; and the bevel of the recess at 8, rides now high up on the bevel of the pivot 5. Fig. 9 simply shows the peripheral relationship of the plunger and seat, in the plane of the seat, marked 6 and 7 respectively, at the above mentioned adjustment. On the other hand, when the adjustment is near the topmost settings, the said respective peripheries (now in disengagement) appear like in Fig. 10. Then to serve flowage better pivot 5 is undercut as shown at 10 Fig. 12.

The adjuster may be mounted in a dial or base 9 (Fig. 8 and Fig. 12), not always coaxially with it. Circumvolving of such base 9, as depicted here, gives no longitudinal motion to pivot 5, but only lateral motions to its axis, if any at all. Hence, when axes of the base 9 and seat 7 happen to agree, moving the dial does not raise or lower plunger 6, since it rolls about always in the same circular path upon the seat 7, leaving the area of the passageway constant in all quarters of the dial.

Such base 9 may be provided with a stop ledge 11 for limiting the outermost adjustment of the screw of the pivot 5; while a turned shaft from thence reaches outside to the thumb wheel.

Also the base 9 may be provided with a limit ledge 12, for any innermost adjustments of the pivot screw.

It is depicted that plunger 6 at an inntermost adjustment of the pivot 5, would fully engage its recess 8 over the full periphery of the pivot at 13; and that periphery 13 would then occupy the position at 14 producing an annuloid (cusps joined) crescent shaped area for the passageway as shown between circles 6 and 7 of Fig. 10. Since ledge 12 carries the last thread of the screw, the further turning of this adjuster 5, changes no area-way in size, especially when the axis of the adjuster's shaft agrees with the axis of the seat.

I claim:

1. A valve of the class described, comprising a casing having a longitudinally disposed bore, a conical valve seat in said bore, a valve plunger carrying a conical valve head to engage said seat, said plunger being of substantially less diameter than said bore and axially movable therein, and an adjusting member extending through the wall of said casing and adapted to engage said head to one side of its axis to slide same axially and laterally of said seat to form a crescent shaped passage between said head and said seat.

2. A valve of the class described comprising, a casing having a longitudinally disposed bore, a conical valve seat in said bore, a conical valve head to engage said seat, a stem connected to said head and extending into said bore, said stem being of substantially less diameter than said bore and axially movable therein, a spring in said bore tending to seat said head, and an adjusting member extending through the wall of said casing to engage one side of said head to force same axially and laterally of said seat to provide a crescent shaped passage between said head and said seat.

3. A valve of the class described, comprising a casing having a longitudinally disposed bore, a conical valve seat in said bore, a valve plunger carrying a conical head to engage said conical seat, said plunger being of substantially less diameter than said bore and axially movable therein, said head having a tapered opening at its smaller end, and an adjusting member extending through the wall of said casing and having a conical end whose axis is disposed eccentrically with respect to said seat and adapted to engage the wall of said opening to move said head axially and laterally of said seat to form a crescent shaped passage between said head and said seat.

LUDWIG F. C. HAAS.